Sept. 20, 1938.  J. S. THOMPSON  2,130,936
CONSTANT FLOW SPILLWAY
Filed March 18, 1938  4 Sheets-Sheet 1
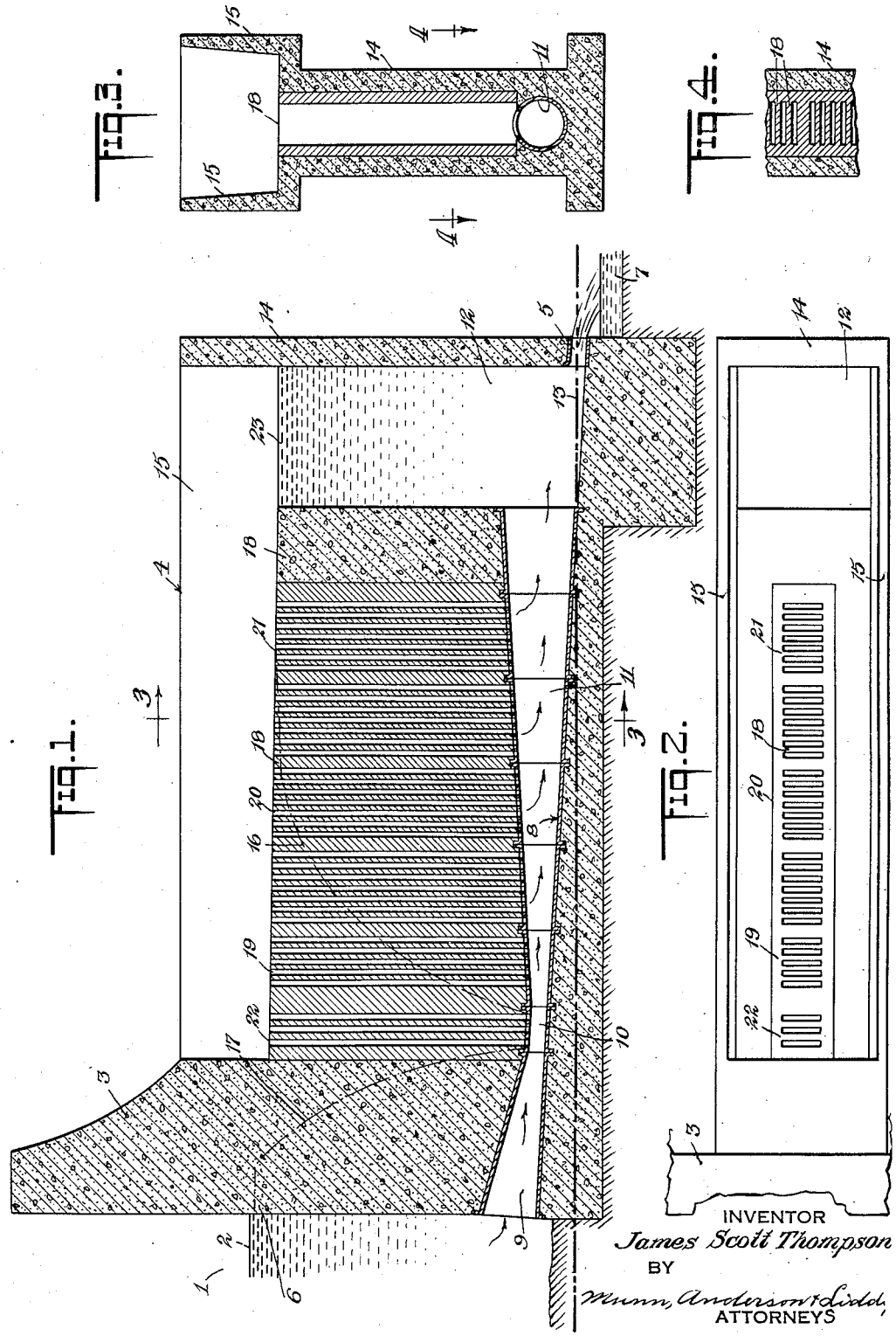
INVENTOR
James Scott Thompson
BY
Munn, Anderson & Liddy
ATTORNEYS

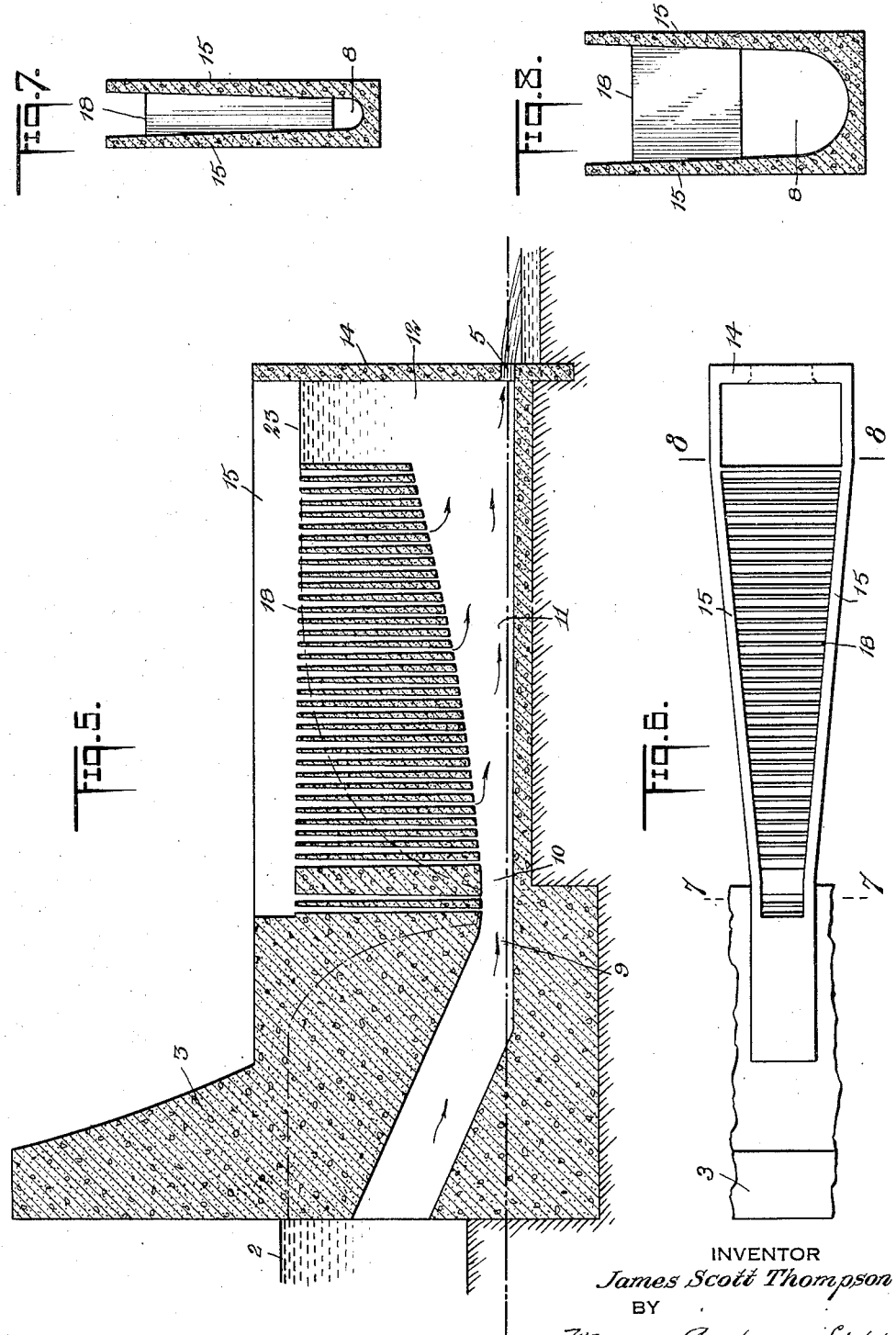

Sept. 20, 1938.  J. S. THOMPSON  2,130,936
CONSTANT FLOW SPILLWAY
Filed March 18, 1938   4 Sheets-Sheet 3
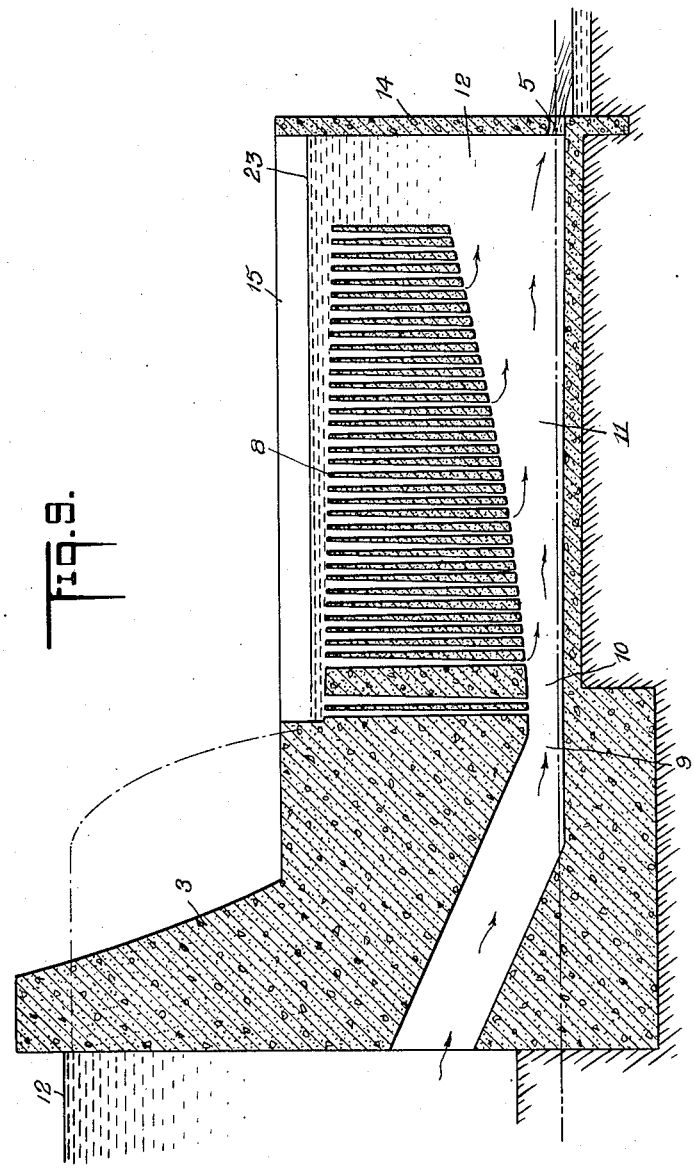
INVENTOR
James Scott Thompson
BY
Murray, Anderson & Liddy
ATTORNEYS

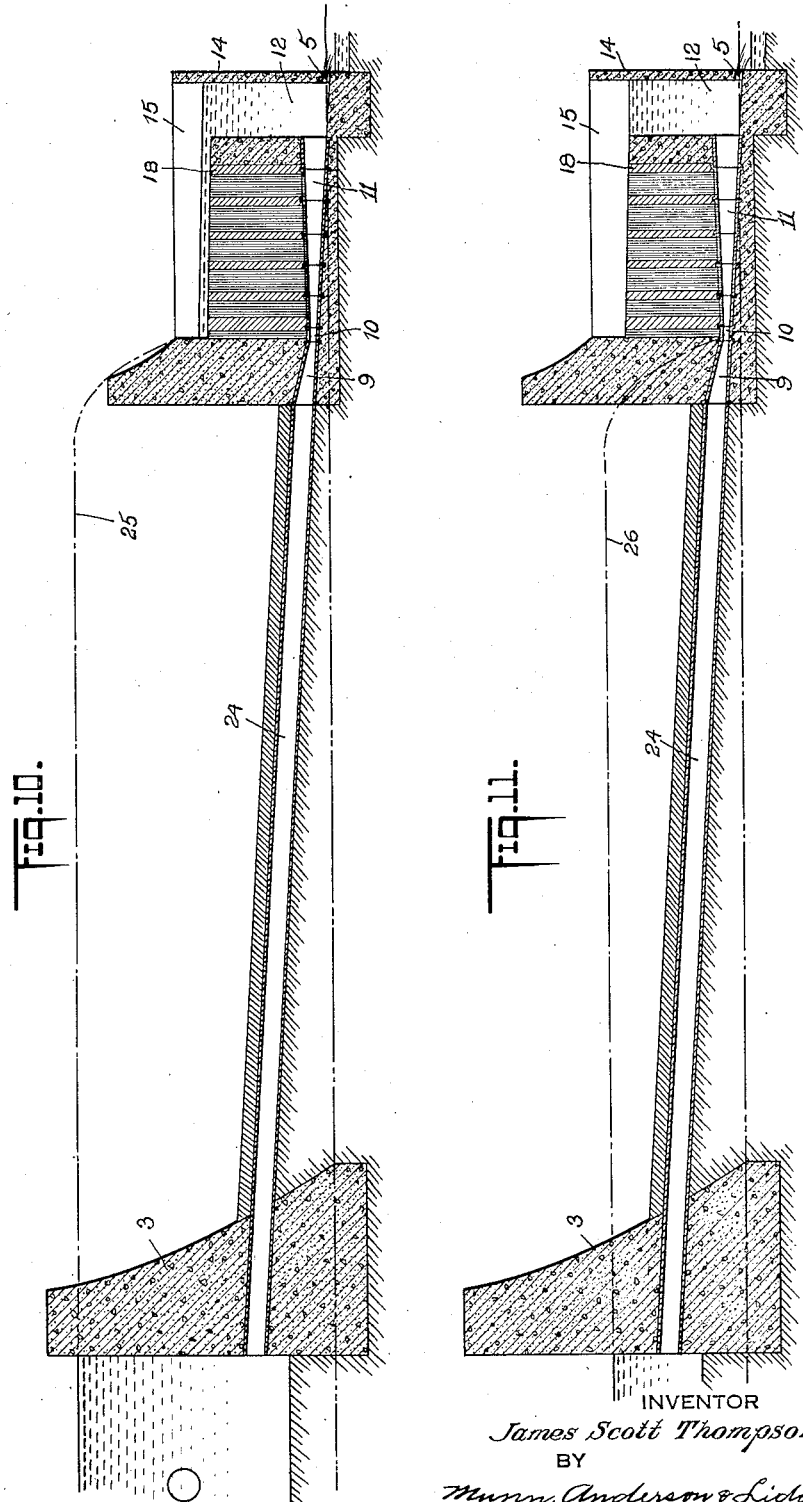

Patented Sept. 20, 1938

2,130,936

UNITED STATES PATENT OFFICE 2,130,936

CONSTANT FLOW SPILLWAY

James Scott Thompson, Hackensack, N. J.

Application March 18, 1938, Serial No. 196,607

7 Claims. (Cl. 61—18)

This invention relates to a constant flow valve which is formed to control the flow of liquid from a reservoir to a pond, pipe line, brook, or other place, and has for an object to provide an improved construction which will automatically cause the outlet to the stream to be constant notwithstanding the variation in the head of the supply reservoir.

Another object of the invention is to provide a device which will automatically regulate the outlet flow from the reservoir of most of the fluid in the reservoir without the use of moving parts.

An additional and more specific object of the invention is to provide a constant flow valve associated with a reservoir and arranged to provide means to throttle the flow of water toward the outlet which will produce a throttling action automatically varied as the head in the reservoir varies.

In the accompanying drawings—

Fig. 1 is a longitudinal vertical sectional view through a constant flow valve disclosing an embodiment of the invention, the valve being shown associated with a supply reservoir and a stream or brook for receiving the flow from the valve;

Fig. 2 is a top plan view of the valve shown in Fig. 1 with a portion of the dam;

Fig. 3 is a transverse sectional view through Fig. 1 on the line 3—3;

Fig. 4 is a fragmentary transverse sectional view through Fig. 3, approximately on the line 4—4;

Fig. 5 is a view similar to Fig. 1 but showing a slightly modified construction;

Fig. 6 is a top plan view of the valve shown in Fig. 5 with a portion of the dam;

Fig. 7 is a fragmentary sectional view through Fig. 6 on the line 7—7;

Fig. 8 is a fragmentary sectional view through Fig. 6 approximately on the line 8—8;

Fig. 9 is a view similar to Fig. 5 but showing an increase in the head of water in the reservoir and also in the valve;

Fig. 10 is a further slightly modified form of the invention wherein the valve is arranged an appreciable distance below the dam and illustrating the water at its maximum height;

Fig. 11 is a view similar to Fig. 10 but showing the water at its minimum height in respect to the functioning of the valve.

Referring to the accompanying drawings by numerals, 1 indicates a reservoir or container having a certain head of water or other liquid 2 confined by a dam which may be of any desired construction. The present invention may be used in connection with any container or reservoir but is preferably used with reservoirs where the water is held back by a suitable dam. In the average reservoir held back by a dam, most of the water is above the central or medial line and the valve embodying the invention is intended to automatically control the outlet of water from the reservoir, said control functioning for an appreciable part of the water in the reservoir, as for instance from 60 to 90 per cent thereof.

As shown in Fig. 1 and also the other figures of the drawings, means have been provided which will automatically control the flow of water from the reservoir without any moving parts or without the attention of a workman. It will, of course, be understood that in many instances it is desired to have a constant flow of water or other liquid from the reservoir notwithstanding the variation in the head of water. Various hand-operated valves or other moving parts might be used to secure this result but it will require the attention of an operator.

As shown in Fig. 1, a valve 4 has been provided which is abutted against the dam 3 but could be spaced therefrom as shown in Figs. 10 and 11. This valve automatically controls the flow of water through the outlet 5 from the line 6 upwardly. From the line 6 downwardly the flow will vary according to the variations in the head. As the amount of water from line 6 downwardly is usually only from 10 to 15 per cent of the quantity capable of being compounded by dam 3, it will be evident that most of the water flowing from the reservoir is automatically controlled.

As shown in Fig. 1, there is a pond or brook 7 into which the outlet 5 discharges. Preferably the valve is arranged so as to discharge into a brook or river and, consequently, there will be nothing to interfere with the flow through the outlet 5. In constructing the valve the same may be made from metal, cement, or other suitable material, or may be made of metal and cement, as may be preferred, and according to certain conditions present at or adjacent the dam.

As shown in Fig. 1, there is provided what may be termed a throttle structure 8 which is illustrated as being formed of metal though it could be made from cement or other suitable material. This throttle structure is formed with a venturi 9 having a throat or a throat member 10 and a conical shaped expanding section. The entire throttle structure 8 may be round in cross section at all points or of other shape in cross section without departing from the spirit of the invention. Also this member may be arranged concentric or eccentric as illustrated in Fig. 1 without departing from the spirit of the invention. It will be noted that the throttle member 8 discharges into a well 12, the bottom of which is slightly below a base line 13 which extends through the center of the outlet 5 and slightly below the bottom of the reservoir 1. The well 12 is provided with an end wall 14 and side walls 15 which are of any desired length to provide a level of water in the valve which will produce a static pressure indicated by line 16 which, in a certain sense, reacts against the static pressure indicated by the line 17. Between the walls 15 and between the end wall 14 and the dam 3, as shown in Fig. 1, there are provided a number of spaced vertical walls 18. These walls are arranged into groups though this is not absolutely necessary. The spaces or channels between the various walls 16 are shown as being substantially the same throughout, but preferably the walls at or adjacent group 19 are spaced closer together than the walls in groups 20 and 21. As an example, the spacing of walls in group 19 may be two inches, while in group 20 the spacing may be three inches, and in group 21 it may be five inches. In group 22, which is directly above the throat 10 of the venturi, the openings are preferably the smallest of all the openings between the respective walls 18.

When the head of water 2 is below the line 6, the flow of water from the reservoir through the outlet 5 will vary with the head, but as soon as the head of water reaches line 6 and starts to move above the same, control will start. As the head of water moves up from line 6, the pressure of the water in the reservoir will naturally increase and, consequently, the velocity of water passing through throat 10 will increase but the water will be allowed to expand in the section 11 and discharge with small veocity into the well 12. As the head in the reservoir moves above line 6 the head or water level 23 in well 12 will rise and overflow some of the walls 18 so that the pressure line 16 will rise and also move toward the group 22. This rising of the pressure line will continue until the head of water under the dam has reached that shown in Fig. 9. This is the maximum of the control of the valve. Up to this point the action of the water indicated by the pressure line 16 will act as a counter-pressure to the head of water in the reservoir and will reduce the velocity of the water as it passes through the throat 10 into the section 11.

In the construction shown in Figs. 5 and 9 the same inventive concept is presented, but instead of having the tops of the various walls 18 in a straight line the arrangement is curved and presents a slightly concave formation though, if desired, it could be made convex. By this arrangement the water from the well 12 begins to overflow a little sooner. Also in this form of the invention the various walls 18 are tapering and are arranged in one group except the walls immediately above the throat.

In Figs. 10 and 11 the same inventive idea is provided as shown in Figs. 1 to 5 and 9, except that there is provided a pipe 24 for connecting the venturi with the reservoir whereby the valve is arranged at a desired point away from the reservoir. The valve in this form of the invention may be as shown in Fig. 1 or constructed similar to the other slightly modified forms. From Fig. 10 it will be seen that the line 25 indicates the height of the static water pressure in the pipe 24 from the reservoir to well 12, while line 26 indicates the height of the static water pressure in pipe 24 from the reservoir to the well of the valve when the head of water in the reservoir has lowered. As the water level in the reservoir increases from that shown in Fig. 11 to that shown in Fig. 10, line 26 gradually moves upwardly until it reaches a maximum height as indicated by line 25 in Fig. 10. If the water in the reservoir should reach a greater height there would be no control for the additional head of water. It will be understood, of course, that the atmospheric head is the same from the dam to the well. Where the velocity head is high the water head is low because all of these heads, including the friction head, must add up the same between the base line and the top of the atmosphere.

In action it will be noted that the water flows from the reservoir through pipe 24, as shown in Fig. 10, or directly into the venturi, as shown in Fig. 1, and finally into well 12 with part of the water passing out through the outlet 5. When the parts are fully functioning, the discharge from well 12 through outlet 5, is due to the height of the water surface in the well and is substantially equal to the discharge from the venturi 9. The channels or openings between the walls 18 carry water from the top of the well to the expansion end of the throttle structure 8, which is really section 11. The water in these channels or spaces between walls 18 throttles or reduces the velocity of the water in the venturi by reducing the expansion in section 11 and increasing the pressure therein. Preferably the depth of the well 12 is so designed that the well overflows before the water line in the venturi 9 reaches the top of the throat 10, otherwise air would be drawn in at the throat.

In operation, as the reservoir head increases the discharge increases on the Venturi principle because of expansion in section 11 and well 12 up to a point where the overflow of well 12 begins. From this point on the increase of discharge is very small due to the increase of the well depth. The regulation of the discharge through the outlet 5 will continue to a point where the expansion in section 11 and well 12 is stopped by throat pressure being made the same as the well pressure. It will also be noted that the throat pressure should be increased evenly in the proper relation to the reservoir head by having the expansion completely stopped only when the reservoir head has increased sufficiently to produce the velocity without any expansion which would be required by the discharge from the well.

The total head of water is, of course, between the well outlet 5 and the reservoir surface. In respect to the channels between the walls 18, it will be understood that the pressure is greater on one side of each channel; consequently, the channels should be made very narrow to make the eddy small and keep friction down.

When the valve is in use there will be provided a constant flow of water through the outlet 5 so that an adequate flow in the brook or river is provided when power or water supply houses have dammed the water-courses. In reference to the well 12 it will be seen that the discharge from well 12 is due to the height of the water therein above the axis of the outlet 5 and a cross sectional area of outlet 5 reduced by friction. The discharge from the intake end of the venturi 9 and the outlet end of section 11 is due to the height of the head of water in the reservoir above the water level in the well 12 and the cross sectional areas of the venturi 9, throttle 10, and section 11 on the venturi principle reduced by friction. When the water reaches the top of the well 12, the pressure in the Venturi outlet is equal to the well pressure and the throttle pressure is much less corresponding to the high throat velocity. If the surface of water in the reservoir is raised any higher, the well surface is also raised and the well pressure will move into the venturi to a point corresponding to the extent and volume of overflow and the venturi pressure at all intermediate points and the throat will be increased so that as the overflow increases the well pressure will advance still further in the venturi until the overflow reaches an extent and volume which is sufficient to make the well pressure equal to the throat pressure. Therefore, the point at which overflow of the well begins is the beginning of constant pressure or what may be called "velocity control". Before this point is reached there has been a normal increase in velocity due to the increase of head up to this point but beyond this point the valve will begin to control so that the flow will be substantially constant.

I claim:

1. A constant flow valve for a reservoir having a variable head comprising a Venturi tube having a converging outlet with the large end connected with said reservoir, said Venturi tube having a throat provided with a slightly diverging outlet, said throat having an aperture in the top and a substantially cone-shaped expansion section for receiving the discharge from the outlet end of said throat, said throat and said section having apertures in the top, means for receiving fluid from said section, and means for directing said fluid when the same reaches a certain head in said apertures to reduce the velocity in said throat and section.

2. A constant flow valve for a reservoir having a variable head including a Venturi tube leading from the reservoir and having its small end extending away from the reservoir, means forming a throat for said venturi, means forming a diverging expansion section for receiving the water from said throat, said last-mentioned means and said throat having apertures in the upper part, means forming a well for receiving water from said expansion section, and means for causing some of said water to pass through said apertures when the head of water in said well has reached a certain height.

3. A constant flow valve for a reservoir having a variable head for causing the discharge from the reservoir to be a substantial constant volume of liquid, said valve including a Venturi tube in free communication with the lower part of said reservoir and having the small end extending away from the reservoir, a throat member forming an extension of the Venturi tube, a conical-shaped section having a small end connected with said throat member for permitting the fluid passing through the throat to expand, means forming a well for receiving the fluid from said section, said means having an outlet and a construction including a plurality of spaced walls with the spaces in communication with said throat and said section, said walls being arranged to guide water overflowing from said well into said throat and said expanding section.

4. A constant flow valve for a reservoir having a variable well including a Venturi provided with a throat, a conical shaped expansion section having the small end connected with said throat, and means for directing water into said throat and said section in a direction at right angles to the normal flow of water through said throat and section for reducing the velocity of the water passing through the throat and section.

5. A constant flow valve for a reservoir having a variable head including a Venturi tube, a conical shaped expansion section having the small end connected to and in free communication with the Venturi tube, means forming a well for receiving fluid from said section, said means having an outlet opening at the bottom, and means adjacent the well for directing fluid from the well downwardly into the throat portion of said Venturi tube and also into said expansion section.

6. In a constant flow valve, a Venturi passageway leading to an outlet, said passageway from the throat to the discharge end being provided with openings in the upper part, and means forming a plurality of spaced walls arranged so that the openings between the walls will merge into the openings in the Venturi passageway, and means forming a well with walls directing the overflow from the well into the space between said walls for causing the fluid passing through said spaces to reduce the velocity of the fluid passing through said Venturi passageway.

7. A constant flow valve for regulating the flow from a reservoir having a variable head including means forming a substantially horizontally positioned Venturi passageway and a plurality of vertically extending passageways leading into said horizontal passageway, said vertical passageways being distributed for substantially the full length of the horizontal passageway, and means forming a well with guiding walls which will direct the overflow from the well to said vertical passageways whereby water passing down said vertical pasageways will reduce the velocity of water passing through said horizontal passageway.

J. SCOTT THOMPSON.